United States Patent
Svensson et al.

(10) Patent No.: US 12,194,553 B2
(45) Date of Patent: Jan. 14, 2025

(54) WELD CUTTING MACHINE AND METHOD FOR CUTTING WELDS

(71) Applicant: UTV CENTER AB, Kil (SE)

(72) Inventors: Robin Svensson, Kil (SE); Sten Åke Karlsson, Kil (SE)

(73) Assignee: UTV CENTER AB, Höglunda (SE)

( * ) Notice: Subject to any disclaimer, the term of this patent is extended or adjusted under 35 U.S.C. 154(b) by 688 days.

(21) Appl. No.: 17/267,052

(22) PCT Filed: Jun. 5, 2019

(86) PCT No.: PCT/SE2019/050523
§ 371 (c)(1),
(2) Date: Feb. 9, 2021

(87) PCT Pub. No.: WO2020/036522
PCT Pub. Date: Feb. 20, 2020

(65) Prior Publication Data
US 2021/0308779 A1    Oct. 7, 2021

(30) Foreign Application Priority Data

Aug. 13, 2018    (SE) .................................... 1850973-7
Dec. 14, 2018    (SE) .................................... 1851588-2

(51) Int. Cl.
*B23D 1/08*    (2006.01)
*B23D 1/00*    (2006.01)
(Continued)

(52) U.S. Cl.
CPC .......... *B23D 79/026* (2013.01); *B23D 1/006* (2013.01); *B23D 1/08* (2013.01); *B23D 7/10* (2013.01);
(Continued)

(58) Field of Classification Search
CPC ... Y10T 409/501968; Y10T 409/50164; Y10T 409/50738; Y10T 409/50–50984;
(Continued)

(56) References Cited

U.S. PATENT DOCUMENTS

| 141,049 A | * | 7/1873 | Harper | B23D 79/00 409/333 |
| 1,389,399 A | * | 8/1921 | Trosch | B23Q 5/404 409/340 |
| 2,564,180 A | * | 8/1951 | Turrettini | B23Q 5/40 82/134 |
| 3,103,852 A | * | 9/1963 | Bonnafe | B23D 39/00 409/285 |

(Continued)

FOREIGN PATENT DOCUMENTS

| CN | 102 848 014 | 1/2013 |
| DE | 20 2008 007773 | 8/2008 |

(Continued)

OTHER PUBLICATIONS

International Search Report issued in parent PCT/SE2019/050523, Sep. 20, 2019, pp. 1-2.
(Continued)

*Primary Examiner* — Erica E Cadugan
(74) *Attorney, Agent, or Firm* — Jeffrey S. Melcher; Melcher Patent Law PLLC (57) ABSTRACT

A weld cutting machine having a first cutting jaw part (4) and a second cutting jaw part (5), a base frame (500) having fixedly attached thereto the second cutting jaw part (5), a power unit and a transmission mechanism (3). The power unit is connected to the transmission mechanism (3) to arrange for movement of at least one of the first cutting jaw part or the second cutting jaw part (4, 5).

13 Claims, 5 Drawing Sheets

(51) Int. Cl.
  *B23D 7/10* (2006.01)
  *B23D 79/02* (2006.01)
  *B23D 79/10* (2006.01)
  *B23Q 5/44* (2006.01)
  *B23Q 9/00* (2006.01)
  *B23Q 9/02* (2006.01)
  *E01B 31/15* (2006.01)

(52) U.S. Cl.
  CPC ........... *B23D 79/10* (2013.01); *B23Q 9/0007* (2013.01); *B23Q 9/0028* (2013.01); *E01B 31/15* (2013.01); *B23Q 5/44* (2013.01); *B23Q 9/02* (2013.01); *Y10T 409/501312* (2015.01); *Y10T 409/501968* (2015.01); *Y10T 409/50738* (2015.01)

(58) Field of Classification Search
  CPC .... B23D 1/006; B23D 79/026; B23D 79/021; B23D 7/10; B23D 79/00–79/12; E01B 31/15; B23Q 5/40–5/44
  USPC .................................................. 409/288–348
  See application file for complete search history.

(56) References Cited

U.S. PATENT DOCUMENTS

| | | | | |
|---|---|---|---|---|
| 3,457,834 A | * | 7/1969 | Seeloff et al. | ......... B23D 79/02 74/89.32 |
| 4,175,897 A | | 11/1979 | Kuchuk | |
| 2011/0103903 A1 | * | 5/2011 | Sture | ....................... B23C 5/003 407/11 |
| 2023/0093743 A1 | * | 3/2023 | Svensson | ................ E01B 29/24 |

FOREIGN PATENT DOCUMENTS

| | | |
|---|---|---|
| EP | 0119820 | 9/1984 |
| GB | 456326 | 11/1936 |
| GB | 608 639 | 9/1948 |
| GB | 2035867 A * | 6/1980 |
| GB | 2316349 | 8/2000 |

OTHER PUBLICATIONS

Written Opinion issued in parent PCT/SE2019/050523, Sep. 20, 2019, pp. 1-7.

* cited by examiner

WELD CUTTING MACHINE AND METHOD FOR CUTTING WELDS

TECHNICAL FIELD OF THE INVENTION

The present invention relates to a weld cutting machine, especially suited for cutting rail welds, comprising a first cutting jaw part and a second cutting jaw part, a base frame having fixedly attached thereto said second cutting jaw part, a power unit and a transmission mechanism, wherein said power unit is connected to said transmission mechanism to move said first cutting jaw part, and wherein connecting members are arranged to enable said first cutting jaw part to move in a guided manner relative said second cutting jaw part.

BACKGROUND

At railway construction and even in repair, rail parts are welded together so that it becomes a coherent welded construction. When welding is made, a weld joint protrudes outside the rail surfaces. This excess part of the weld joint contains some slag and partly to remove slag but also to smooth the surface, the protruding part of the weld joint is cut with a special cutting machine. Other options are also available, such as grinding, but it is very time consuming and therefore weld cutting machines have gained more and more entry. From GB456326 there is known an old weld cutting machine having a design that presents many disadvantages, e.g. inability to deliver adequate forces.

Today's weld cutting machines are complex and heavy, e.g. as known from U.S. Pat. No. 4,175,897, GB 2316349 and EP0119820. One reason is that known machines mostly use hydraulics to drive the jaws that cut the excess portion of the weld string. Hydraulics have some disadvantages, among other things, hydraulic oil is an environmental problem, but it also makes the weld cutting machine heavy. Known weld cutting machines are generally therefore too heavy to be handled by a single person.

Further known weld cutting machines use cutting jaws that are relatively expensive and also relatively complex to exchange.

SUMMARY OF THE INVENTION

The object of the present invention is to provide a solution to the issues mentioned above by providing an improved welding cutting machine, as well as an improved method for cutting welds.

The object according to the invention is achieved by a welding cutting machine comprising:
  a first cutting jaw part;
  a second cutting jaw part;
  a base frame having fixedly attached thereto said second cutting jaw part; and
  a power unit and a transmission mechanism,
  wherein said power unit is connected to said transmission mechanism to arrange for movement of at least one of said first cutting jaw part or said second cutting jaw part,
  wherein connecting members are arranged to enable said first at least one cutting jaw part to move in a guided manner relative said second cutting jaw part,
  wherein said power unit is an electric motor,
  wherein said connecting members include at least two rods,
  wherein each rod of said at least two rods being arranged with at least one set of threads arranged to transfer torque applied via said transmission mechanism to said rods to provide linear movement of at least one of said first cutting jaw part or said second cutting jaw part, and
  wherein said transmission mechanism includes at least two parts, a first reduction transmission arranged to reduce an incoming rotational speed from the electric motor and a second dividing transmission arranged to transmit an outgoing torque from said first reduction transmission synchronously to both of said at least two rods, and
  wherein said at least two rods are slidably arranged in relation to said transmission mechanism via drive members fixedly attached to outgoing drive wheels of said dividing transmission.

Thanks to the invention a weld cutting machine is provided that is substantially lighter than prior art machines, enabling a single person to carry the machine. Further, the invention in the basic principle may completely utilize mechanical drive of the cutting jaws, which provides an environmental advantage compared to prior art machines.

According to a further aspect of the present invention there is provided a solution regarding cutting jaws by providing an improved design, as well as an improved method, for such weld cutting jaws that may be provide a more cost-efficient solution compared to prior art.

BRIEF DESCRIPTION OF THE DRAWINGS

The invention will be described in more detail in the following with reference to the accompanying drawings, which for the purpose of exemplification illustrate embodiments of the invention.

DETAILED DESCRIPTION

Figure 1:
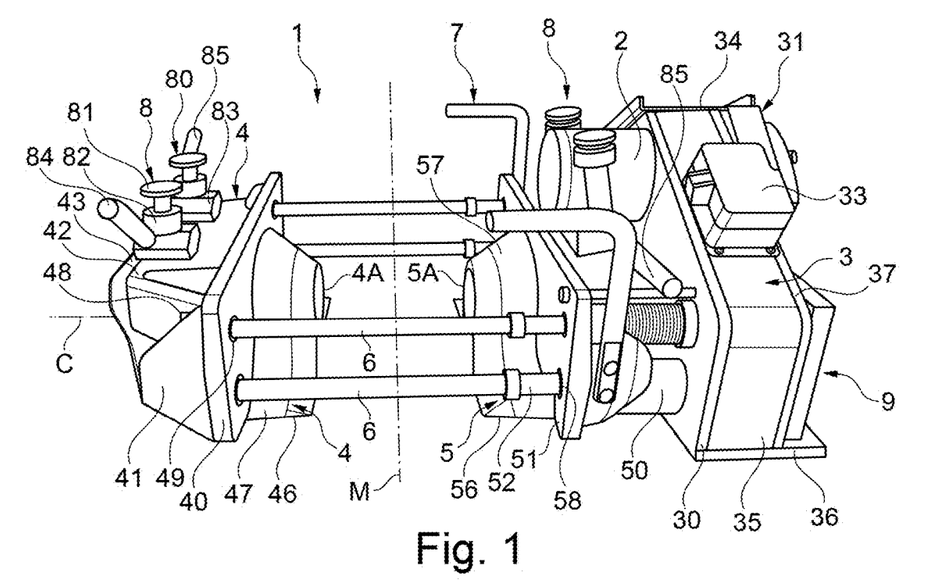
FIG. 1 shows a perspective view of a preferred embodiment of a machine that may be used together with the invention for cutting welds in connection with rails construction.
Figure 2:
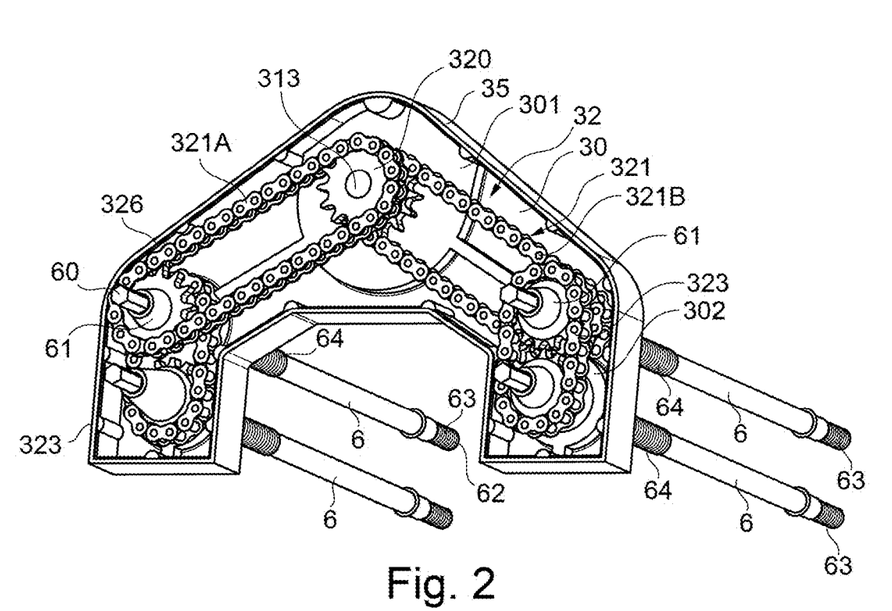
FIG. 2 shows a perspective view of a preferred embodiment of a first part of the transmission of a preferred embodiment of a machine that may be used together with the invention.

The invention relates to a weld cutting machine 1 comprising cutting jaw parts 4, 5, which machine may be lighter than known machines. In FIG. 1 there is shown a perspective view of an exemplary welding machine 1 that may be used in together with the invention and in FIG. 2 there is shown a perspective view of an outgoing part 32 of an exemplary transmission mechanism 3.

In a preferred weld cutting machine 1 according to the invention, a relatively small high-speed electric motor 2 operates a transmission mechanism 3 adapted for the purpose of providing a desired transmission. This transmission mechanism 3 comprises, two parts. On the one hand, a planetary gear 31 (in FIG. 1, the position of the planetary gear is indicated by the arrow, preferably the planetary gear includes an arrangement, shown in FIGS. 3 and 4) driven by the output shaft 312 of the motor 2 and a chain/wheel mechanism 32 (see FIG. 2) driven by the output 342 (see FIG. 3) from the planetary gear 31. Two cutting jaw parts 4,5, a first 4 and a second 5, are aligned on each side of a gap having a central plane M extending transversally in relation to the direction of relative movement of the jaws 4, 5, which movement is the same as the extension C of a rail part at which the machine is used.

At least one cutting jaw part 4, 5 is movably disposed by means of drive rods 6, e.g. having the first cutting jaw part 4 movable in relation to the second fixed jaw part 5. The first cutting jaw part 4 includes a movable support body 40,41, 42,43 having a transversal movable support plate 40 with a first set of fixed threaded bushings 48 attached on a backside in line with a through hole 49 in the transversal support plate 40. Each threaded bushing 48 interacts with first threads 63 at a first end 62 of the drive rod 6. A plurality, preferably four, drive rods 6 are arranged in parallel.

The chain/wheel mechanism is a preferred dividing transmission device 32, for dividing the output torque from the, preferably centrally positioned, reduction gear in the form of a planetary gear 31 to synchronously drive at least two rod 6, wherein the at least two rods 6 extend parallelly along the centre line C and are positioned equidistant from the centre line C. It is evident for the skilled person that various transmissions, e.g. cog wheel train, belt transmission, etc, may be used to achieved basically the same functionality, but a chain/wheel mechanism may provide extra advantages.

The second jaw part 5 is fixed in relation to a base frame 500, including a fixed support body that preferably has the same design as the support body to the first jaw part 4, e.g. including a transversal fixed support plate 51. The drive rods 6 extend along the machine through holes 58 in the fixed transversal support plate 51 of the fixed jaw part 5, further through distances 50 and then with second end parts 60 into the transmission mechanism 3. A second set of fixed threaded bushings 52 are attached to the transversal support plate 51 of the second jaw part 5. The fixed threaded bushings 52 interact with second threads 64, positioned at a distance from the first threads 63, wherein the direction of the threads 63, 64 are opposite to each other. As a consequence, upon rotation of a drive rod 6, the drive rod 6 will move in the desired direction relative the fixed transversal support plate 51 of the second jaw part 5 and at the same time also force the first cutting jaw part 4 to move in the same direction, thereby either increasing or decreasing the gap, depending on the rotational direction.

The base frame 500 also includes a fixed housing 30, 35, 36, 37 of the transmission mechanism 3, i.e. the second support body and the fixed housing 30, 35, 36, 37 are fixedly attached to each other. Inside the housing of the chain/wheel mechanism 32 there are four drive members 61 that are in engagement with the second end parts 60 of each drive rod 6 arranged to transfer torque from the chain/wheel mechanism 32 to the drive rods 6, preferably by a form-locking shaped part 65, e.g. hexagonal interfit.

The output shaft 319 (labelled in FIG. 8, see also the central passage 313 of the output shaft 319, labelled in FIG. 2) from the planetary gear 31 is positioned along a central plane (including the intended line of extension C of a rail) within the fixed housing 30, 35, 37 of the chain/wheel mechanism 32. The fixed housing 30, 35, 37 is arranged with a first transversal wall 30 providing support for bearings/parts of the transmission mechanism 3, e.g. a first supporting structure 301 for the motor 2 that is attached to an inner side of the first transversal wall 30. Further there is a plurality of second supporting structures 302 each providing support for a drive member 61 of a drive rod 6.

The drive members 61 preferably enable the rods 6 to slide forth and back within them, which preferably is achieved by the use of drive members 61 that include an outer part of a harder material (e.g. steel, which preferably also is weldable) and an inner part of a softer material (e.g. brass), to thereby enable the form-locking shaped part 65 of the drive rods 6 to slide relative the drive members 61 with low friction and also enable high strength (e.g. steel) chain wheels 610 to be welded onto the outer periphery of drive member 61.

The output 342 (see FIG. 3, wherein parts of the planetary gear is shown) of the planetary gear 31 (see FIG. 4) drives a shaft 319 (labelled in FIG. 8, see also the central passage 313 of the output shaft 319, labelled in FIG. 2) having two central chain wheels 320 fixed thereto, e.g. by splines. The central chain wheels 320A, 320B drive one first chain 321 each. One first chain 321A is driven by a first central chain wheel 320A that drives a first output chain wheel 610 at a first side of the housing 30, 35, 37. A second central chain wheel 320B drives the second first chain 321B which at the opposite side of the housing 325 drives a second output chain wheel 610. The design is symmetric in relation to a vertical central plane, which provides for balanced reaction forces. Merely one side will be described in the following. The output chain wheel 610 drives one of the drive rods 6 and also a coaxial transfer chain wheel 630, which is also fixed to the drive member 61. The transfer chain wheel 630 in turn via a second chain 323 drives a second output chain wheel 631. The second output chain wheel 631 is attached to a drive member 61 of a second drive rod 6 on that side. The chain/wheel mechanism 32 thereby may transfers an output rotating torque to the (torque transmitting) drive members 61 connected to the second ends 60, which thereby rotate the drive rods 6 synchronously and create a linear motion of the movable jaw part 4, partly by movement of the drive rods 6 themselves, via the fixed threaded bushings 52 and partly of the movable jaw part 4 via the bushings 48.

Figure 3:
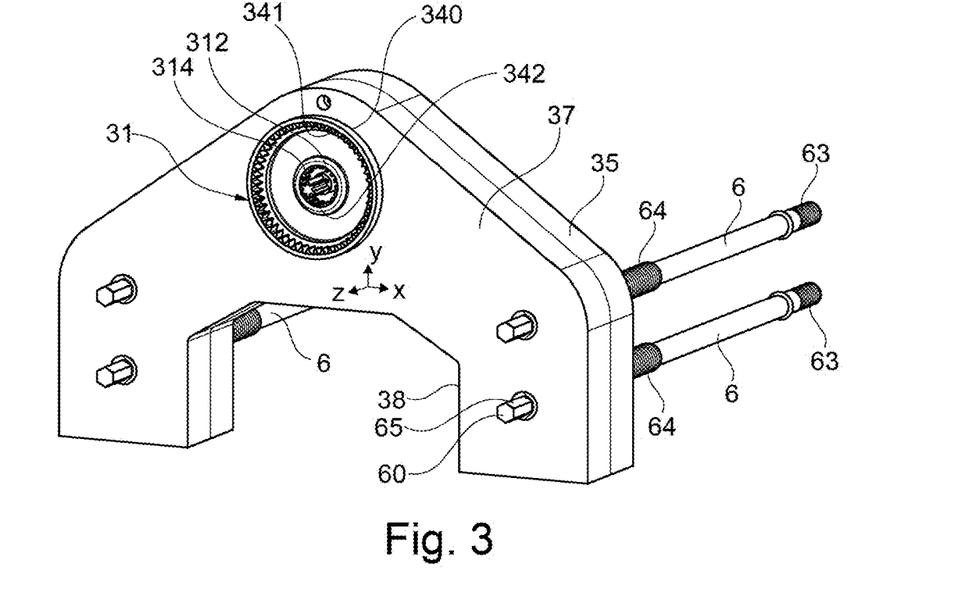
FIGS. 3 and 4 show perspective views of a preferred embodiment of a second part of the transmission of a preferred embodiment of a machine that may be used in together with the invention.
Figure 4:
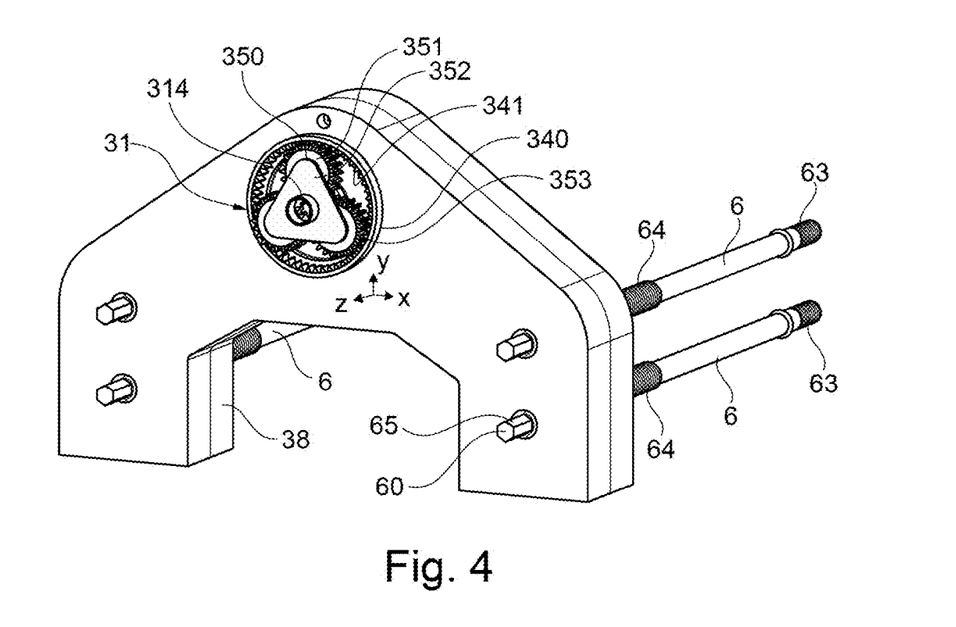

In FIGS. 3 and 4 the design of the planetary gear 31 is shown in more detail. The motor 2 and the planetary gear 31 are attached to opposite sides of the fixed housing 30, 35, 37. Preferably, the planetary gear 31 is attached to an outer side of the outer side plate 37 of the housing, whereas the motor 2 is attached to the outer side of the inner transversal wall 30. Hence the output shaft 312 of the motor 2 will pass through the housing, preferably through a central passage 313 of the output shaft 319 (labelled in FIG. 8, see also the central passage 313 of the output shaft 319, labelled in FIG. 2) carrying the two central chain wheels 320.

At the outer end of the motor output shaft 312 there are dents forming a sun wheel 314 that mesh with dents 353 at the inner side of planet wheels 351 of the planet assembly 350. The planet assembly 350 includes three circular planet wheels 351 symmetrically attached to a planet carrier 352, having a central collar 354 providing support/bearing (not shown). The planet carrier 352 may rotate together with the planet wheels 351. The planet wheels 351 at their outer sides mesh with dents of a fixed ring wheel (not shown) and also with dents 341 of a rotatable ring wheel

340. The rotatable ring wheel 340 is non rotatably attached via dents 341 at its inner periphery to a shaft 319 (labelled in FIG. 8, see also the central passage 313 of the output shaft 319, labelled in FIG. 2) carrying the two central chain wheels 320 and thereby drives the chain/wheel mechanism 32.

In the preferred embodiment the planetary gear is a harmonic gear, i.e. the rotatable ring wheel 340 and the fixed ring wheel have different amounts of dents, e.g. 51 and 48 respectively, which provides for a drastic reduction of the rotational speed from the motor shaft 312 to the rotatable ring wheel 340. In an exemplary embodiment the number of dents of the motor shaft 312 is 6 and each planet (3 pcs) has 22 dents. In combination with a ring wheel (first outer ring) that is fixed having 48 dents and a rotatable ring wheel 340 (second outer ring) having 51 dents there will be achieved a gear ratio of 1:153, i.e. when the sun wheel 314 has made 9 turns, each planet has made one turn (360 degrees) and thereby have driven the rotatable outer ring 1/17 of a turn.

Thanks to the transmission mechanism 3 and its combination of the (preferably harmonic kind) planetary gear 31 and the chain/wheel mechanism 32, a reliable and compact torque transfer/rotational motion is provided to the drive rods 6.

The use of an electric motor 2 may further provide the advantage that an adaptive torque/speed is automatically created to the drive rods 6, in that the higher the resistance the lower the transmitted speed to the drive rods 6, i.e. when the resistance increases the rotational speed is reduced and the torque of the motor 2 increases and thus the force that effect the moving jaw 4. Preferably an outboard electric motor 2 is used that may provide a larger torque than traditional motors.

Furthermore, there is shown that there is a kind of base frame 500 that fixates basics parts of the weld cutting machine 1; the fixed supporting structure including the transversal support plate 51, the electric motor 2, the fixed housing 30, 35, 37 of the chain/wheel gear 32, the planetary gear 31 and other parts that need to be fixated at least in one direction in relation to the second jaw part 5. Moreover, the base frame 500 also has handles 7 attached thereto for ease of carrying and lifting the weld cutting machine 1. At the outer side of the outer plate 37 of the chain/wheel gear housing there is an expandable protection devise 9, having a protecting plate at the outer end and resilient, expendable rubber membrane enclosing a space. This protective device 9 enables the drive rods 6 to move out from the fixed housing 30/35/37 and to be protected from dirt and dust, entering into the space.

Figure 5:
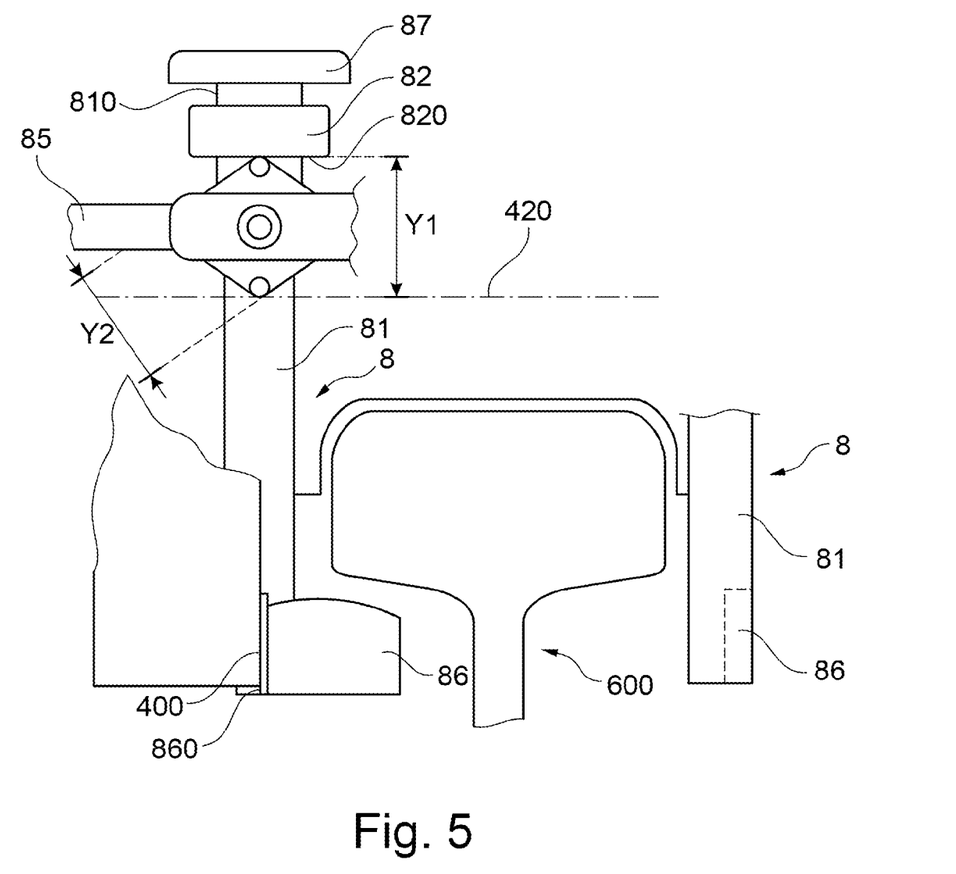
FIG. 5 shows a schematic side view of a preferred embodiment of a an adjustable guide arrangement that may be used together with the invention.

Moreover, as schematically shown in FIG. 5 there may be adjustable guide members 8 arranged at each jaw part 4,5. There are two such adjustable guide members 8 arranged at each of the jaw part 4,5. Each adjustable guide member 8 includes an adjustable rod 81, preferably threaded 810, that passes through a passage in a pivotable body 83. The adjustable rod 81 has an adjustable abutment member 82, preferably in the form of a nut that interacts with the pivotable body 83. At the lower end of the adjustable member 81, there is attached a guide member 86 (making it and the rod L-shaped), which guide member 86 is intended to enable gripping underneath the head of a rail 600 to safeguard that the weld cutting machine 1 is appropriately guided along the rail during the cutting process. Each adjustable rod 81 may be rotated 90 degrees, preferably by means of a wheel member 87 at the top of each rod 81, such that the guide member 86 may be moved in and out from a position underneath the rail head (see left hand view in FIG. 5) and parallel with the rail (see left hand view in FIG. 5) to not grip under the rail 600. Abutting jaw surfaces 400 that interact with abutting sides 860 of the guide member 86 assist in correct positioning. Furthermore, each pivotable body 83 is arranged with handle 84, 85 (see FIG. 1). By means of pivoting the handle 84, 85 from an active position (See position of handle 85 in FIG. 1) to an inactive position (see position of handle 84) the adjustable member 81 with the guide member 86 will be moved from a gripping position to an un-gripping position, which is achieved by having a camming action by the pivotable body 83 between an upper contact surface 420 of each jaw 4,5 and a lower contact surface 820 of each adjustable abutment member 82, i.e. a larger cross sectional measure Y1 in the active position than the cross sectional measure Y2 in the inactive position. Thanks to this arrangement the weld cutting machine 1 can be easily mounted and dismounted onto/off a rail 600 to perform a cutting operation.

In operation, the weld cutting machine 1 is transported to the weld between two rail parts, which is to be cut. The transportation may easily be performed by carrying the weld cutting machine 1 by hand, holding in to the handles 7. A protective plate 36 may be arranged at the bottom of the gear will housing 30, 35, 37 in order to enable weld cut machine to be put down but also uneven ground without risk of causing damages. The weld cutting machine 1 is then lifted on to the rail (not shown) having the weld that is to be cut. The handles 84, 85 are then in inactive mode and the guide members 86 are parallel with the rail 600. The weld cutting machine 1 is positioned such that the weld is positioned in the gap between the two jaw parts 4,5, and preferably such that the weld is close to the fixed jaw part 5. The rail will fit into the gaps 4A, 5B of the jaw parts 4,5 and also in the gap 38 in the housing 30, 35, 37, which has the form of an inverted U.

A battery, (not shown), which may be carried separately, is positioned in a battery holder 34, preferably positioned on top of the housing 30, 35, 37. The battery provides power to the electric motor 2 and also a control unit 33, e.g. attached to upper side of the housing 30, 35, 37. Further, the adjustment members 8 are activated by first turning the wheel members 87 to turn the guide members 86 and thereafter pivoting the handles 84, 85 into the active position, i.e. by pivoting downwards. Now the adjustable abutment member 82 is turned until the guide members 86 contact and grip under the rail head.

In a next stage the adjustable abutment member 82 is turned to obtain a desired play during cutting, e.g. about 1 mm, and then the adjustable rod 81 is pushed down to again obtain contact with the lower contact surface 820 on the pivotable body 83. Hence, now the guide members 86 have been positioned into a desired guiding position underneath the head of the rail 600. Hence, an appropriate clearance between the surfaces of the rail and the guide members 86, e.g. about one millimeter, is provided for by adjusting the adjustment member 86. Now the weld cutting machine 1 is ready to be operated. Once the machine is started the electric motor 2 starts spinning whereby the rotation will be transmitted first to the planetary gear 31 and then to the chain/wheel gear 32 to rotate the drive rods 6, whereby the movable jaw part 4 will start moving towards the weld that is to be cut. Preferably a harmonic planetary gear is used that provides a gear ratio of at least 1:100 and an electric motor 2 rotating with at least 3000 rpm, preferably about 4000-6000 rpm. The electric motor 2 will quickly move the movable jaw part 4 in a first stage when there is no resistance and move it more slowly once resistance is encountered when the jaw front 46 meets the weld, thereafter the two jaw fronts 46, 56 will move towards each other to cut the weld, which is achieved when the two jaw fronts 46, 56 meet each other.

Thereafter the weld cutting machine is easily dismounted by pivoting the handles 84, 85, such that the guide members 86 get out of contact with the rail head. Then the wheel members 87 may be easily turned to position the guide members 86 parallel with the rail 600, whereby the machine 1 is free to be lifted up from the rail.

The above exemplified solution of machine 1 means that the jaw parts 4, 5 may be moved relatively quickly along the rail surface towards the weld joint with relatively little force and that as soon as the movable jaw 4, with the firm jaw engaging from the other side engages the weld joint, the speed will be lowered, and the torque/force will be increased and adapted to the need. Maximum power produced by a well-functioning prototype is above 10 tonnes, preferably above 12 tonnes. Thanks to the construction, a machine 1 may be obtained having about half the weight, about 25 kg, compared with known hydraulic machines that weigh about 50 kg.

As is shown in FIG. 1 the cutting jaws 4,5 may be divided into jaw fronts 46, 56 being wear sections and support sections 57, 47, respectively. Thanks to the division several advantages may be gained. Firstly, a lighter and less expensive material can be used in the support sections 57, 47, i.e. making the machine, as a whole, less heavy. Secondly the coupling surface between jaw fronts 56, 46 and support sections 57, 47 can be designed so that heat expansion can occur between them, implying that the jaw fronts 56, 46 may be made in materials optimized for cutting without any need of compromise in relation to difference regarding heat expansion, which is a problem in known wedge cutting machines, i.e. cutting at high speed may lead to heat cracks. Thirdly, a cheaper wear section may be obtained, since the kind and amount of material in the easily exchangeable wear section may be optimized in regard to cutting as such. In addition, the coupling surface (not shown) between the jaw fronts and support sections according to a preferred embodiment can be designed so that a change can be made very quickly and easily, only by means of shape fitting, that is, without the need for a screw joint, which eliminates the need for time-consuming release and fixation of wear parts.

Figure 6:
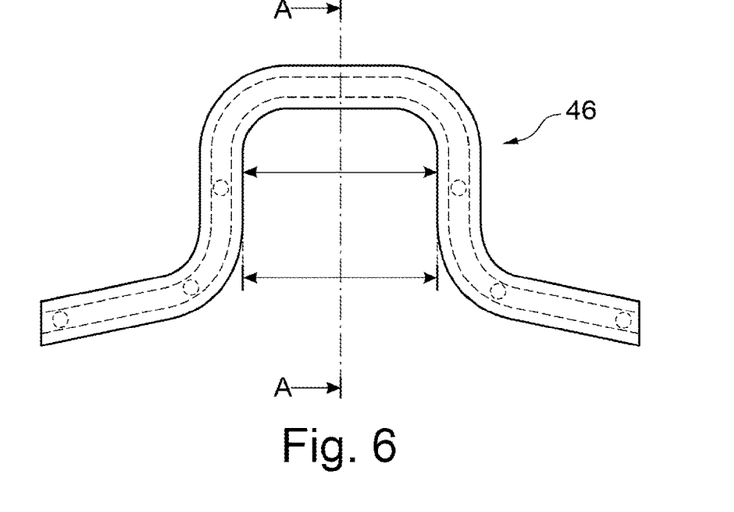
FIG. 6 shows a front view of a preferred embodiment of a wear section according to the invention.
Figure 7:
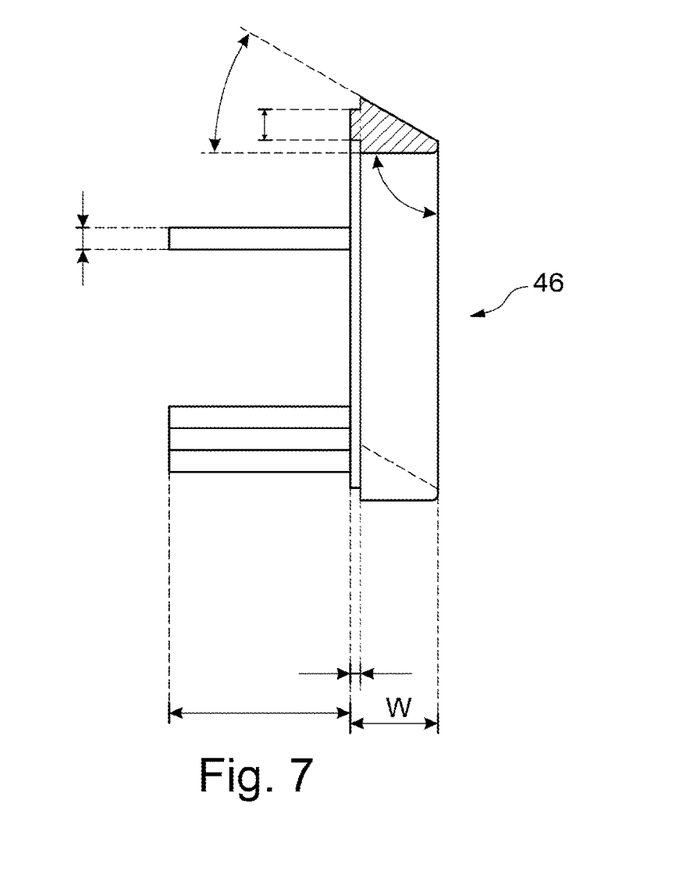
FIG. 7 shows a cross-sectional view along A-A in FIG. 6, and, FIG. 8 shows schematic perspective view of a modification in accordance with the invention.

In FIGS. 6 and 7 there is shows a preferred embodiment of a jaw front 46 according to the invention. As noted in FIG. 6 the width W of the jaw front is relatively small, i.e. in the range of 10-40 mm, more preferred 25-30 mm.

It is evident for the skilled person that the novel cutting jaws 4, 5, divided into jaw fronts 56, 46 being wear sections and support sections 57, 47, respectively, may also be used together with weld cutting machines of other kind, i.e. in place of homogeneous jaws. Also, the adjustable fastening device 8 for fixing the machine 1 to a rail, including an easily handled pivot mechanism 83 enabling easy and safe locking and unloading of the machine 1, may of course also be used together with other weld cutting machines.

Figure 8:
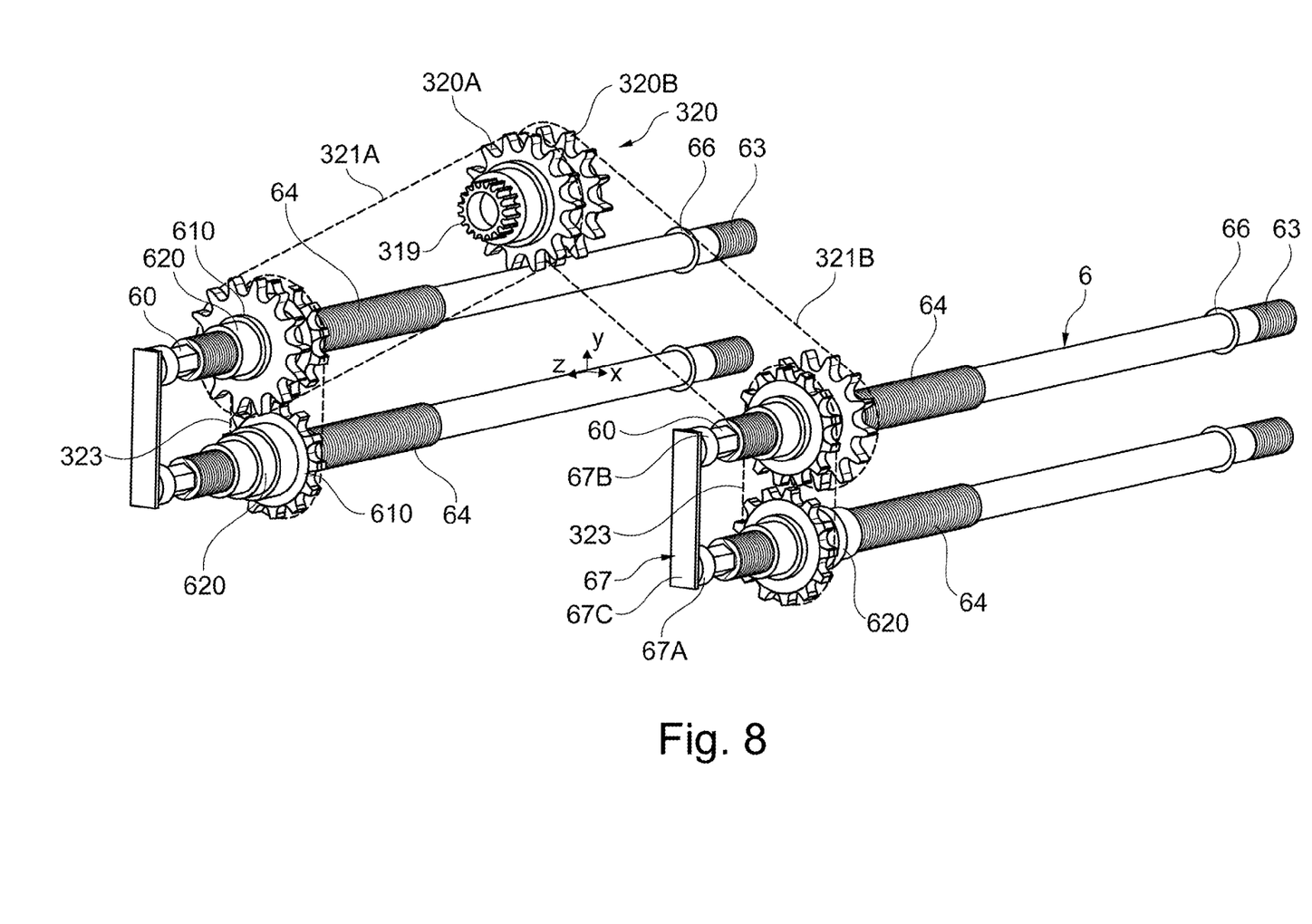

In FIG. 8 there is shown schematic perspective view of a modified transmission arrangement according to the invention. A major difference compared to the above-described embodiment of the invention is that the rods 6 in this embodiment do not rotate but are stationary. As an exemplary solution to keep the rods 6 stationary FIG. 8 shows the use of locking members 67 that are fitted to the end parts 60 of each pair of rods 6. Accordingly, there is one locking member 67 at the righthand pair of rods 6 and a second locking member 67, of exactly the same kind, that locks the rods 6 of the left-hand pair. The locking function is achieved by having form shaped fit between each rod end 60 of the rods 6 having a corresponding shape (male/female or vice versa) as the solid locking member 67, e.g. heaxagonal. Accordingly, each locking member 67 has first and the second locking member 67A, 67B that interfit with the end part 60 of each one of a pair of rods 6. In between the locking members 67A, 67B there is a solid body 67C that keeps the members 67A, 67B in fixed positions. Accordingly, the locking members 67 safeguard that no rotation is possible for any of the rods 6.

Further, as presented above the rods are arranged with driving threads 64, for transfer of movement of one of the cutting jaw parts 4, 5. In this embodiment it will be the second cutting jaw part 5 that will move along the rods 6. This movement is achieved by rotating the drive member 620 which are fixedly positioned within the second cutting jaw part 5 by means of bearings (not shown). The drive members 620 are preferably made in a material that is of a different kind than the material in the rods 6, e.g. brass, in order to provide for low friction but for the skilled person it is evident that different kind of materials may be used for the drive members 620, e.g. also of same material, to fulfil the desired basic function, by use of appropriate lubrication. By use of brass in the drive members 620 lubrication may be eliminated, which is an advantage in respect of several aspects. The drive members 620 may be driven by various appropriate transmission mechanisms.

As already described above a preferred transmission mechanism could be chain gears 320, 321, 323, to transmit, torque and rotation from the central output wheel 320. As it's indicated in FIG. 8, the central driving wheel 320 is mounted on output shaft 319, by means of splines, to transmit torque/rotation from the output of the reduction gear 31. Two identic chain wheels 320A, 320B, drive one chain each 321A, 321B that in turn drive one identic second chain wheel 610 each fixedly attached to a first drive member 620 on a first rod 6 within each pair of rods 6. The torque/rotation is thereafter also transmitted to the second rod 6 within each pair of rods 6 by means of second chains 323. A third chain wheel 630 parallel to the input wheel 610 is attached to the first drive members 620. Each second chain 323 is connected the third chain wheel 630 and also to a fourth chain wheel 631 that is fixedly attached to a second drive member 621. Accordingly, there are four drive members 620, 621 each being rotated synchronically. As a result, the rods 6 will be sliding forth and back by means of rotating the drive members 620, 621 to thereby increase and decrease the gap between the jaw parts 4, 5 according to the invention. In this embodiment the first jaw part 4 is fixedly attached to the rods 6 at one end, opposite to the end having the locking member 67, by means of fixation threads 63. Nuts may by threading onto the threads 63 clamp the second jaw part 4 tightly in contact with supporting collars 66 on the rods 6. Accordingly, the first jaw part 4 is securely fixed and connected to one end of the rods 6.

The invention is not limited by the embodiments presented above but may be varied within a plurality of aspects without departing from the basic principles of the invention. For instance, it is evident that instead of using a separate shaft 319 it may be integrated with the planetary gear 31 and/or the drive wheels 320. Further, if using a cog wheel train instead of a chain transmission it may suffice with one single outgoing member 320. It is foreseen that some of the aspects described above may be the subject for their own protection by one or more divisional applications, e.g. the use of separate wear parts, which may not be limited to a weld cutting machine according to the invention but may also be used in other kind of weld cutting machines.

The invention claimed is:

1. A weld cutting machine comprising:
a first cutting jaw part;
a second cutting jaw part;
a base frame having fixedly attached thereto said second cutting jaw part; and
a power unit and a transmission mechanism,
  wherein said power unit is connected to said transmission mechanism to arrange for movement of said first cutting jaw part,
  wherein connecting members are arranged to enable said first cutting jaw part to move in a guided manner relative said second cutting jaw part,
  wherein said power unit is an electric motor,
  wherein said connecting members include at least two rods,
  wherein each rod of said at least two rods is arranged with at least one set of threads arranged to transfer torque applied via said transmission mechanism to said rods to provide linear movement of said first cutting jaw part,
  wherein said transmission mechanism includes at least two parts, a first reduction transmission arranged to reduce an incoming rotational speed from the electric motor and a second dividing transmission arranged to transmit an outgoing torque from said first reduction transmission synchronously to said at least two rods, and
  wherein said at least two rods are slidably arranged in relation to said transmission mechanism via drive members fixedly attached to outgoing drive wheels of said dividing transmission.

2. The weld cutting machine according to claim 1, wherein said first reduction transmission includes a planetary gear.

3. The weld cutting machine according to claim 2, wherein each rod of said at least two rods has an associated chain wheel and drive chain, and wherein an outgoing member of said planetary gear.

4. The weld cutting machine according to claim 1, wherein said second dividing transmission includes a chain wheel transmission.

5. The weld cutting machine according to claim 1, wherein said dividing transmission is arranged in a fixed housing comprising a central, inverted U-shaped gap, which is symmetrically arranged in relation to a center line of a rail when the weld cutting machine is in operation.

6. The weld cutting machine according to claim 5, wherein an expandable housing is arranged at one side of said fixed housing, the expandable housing is arranged to enable said at least two rods to move within a protected space of said expandable housing to a position outside of said expandable housing.

7. The weld cutting machine according to claim 1, wherein said drive members include threads interacting with the threads of each of the at least two rods.

8. The weld cutting machine according to claim 1, wherein each of said at least two rods is arranged with two sets of the threads.

9. The weld cutting machine according to claim 1, wherein each cutting jaw part includes a wear section and a support portion.

10. The weld cutting machine according to claim 9, wherein said wear section and said support portion are made of different materials.

11. The weld cutting machine according to claim 9, wherein said wear section is arranged at said support portion by means of shape fitting.

12. A weld cutting machine comprising:
a first cutting jaw part;
a second cutting jaw part;
a base frame having fixedly attached thereto said second cutting jaw part; and
a power unit and a transmission mechanism,
  wherein said power unit is connected to said transmission mechanism to arrange for movement of said first cutting jaw part,
  wherein connecting members are arranged to enable said first cutting jaw part to move in a guided manner relative said second cutting jaw part,
  wherein said power unit is an electric motor,
  wherein said connecting members include at least two rods,
  wherein each rod of said at least two rods is arranged with at least one set of threads arranged to transfer torque applied via said transmission mechanism to said rods to provide linear movement of said first cutting jaw part,
  wherein said transmission mechanism includes at least two parts, a first reduction transmission arranged to reduce an incoming rotational speed from the electric motor and a second dividing transmission arranged to transmit an outgoing torque from said first reduction transmission synchronously to said at least two rods, and
  wherein a respective pair of adjustable guide members is arranged at each of the first cutting jaw part and the second cutting jaw part comprising a rod shaped member carrying a turnable guide member arranged to guide the weld cutting machine along a rail.

13. The weld cutting machine according to claim 12, wherein said adjustable guide members include a pivotable body arranged to move said guide members between an active position which the guide members contact the rail and an inactive position which the guide members do not contact the rail.

* * * * *